United States Patent
Mizuhara

[15] 3,652,237
[45] Mar. 28, 1972

[54] COMPOSITE BRAZING ALLOY OF TITANIUM, COPPER AND NICKEL

[72] Inventor: Howard Mizuhara, San Mateo, Calif.
[73] Assignee: Western Gold & Platinum Company
[22] Filed: July 28, 1970
[21] Appl. No.: 58,918

Related U.S. Application Data

[62] Division of Ser. No. 716,455, Mar. 27, 1968, Pat. No. 3,561,099.

[52] U.S. Cl. .................................................29/198, 29/199
[51] Int. Cl. .............................................................B23p 3/06
[58] Field of Search ..........................................29/198, 199

[56] References Cited

UNITED STATES PATENTS

| | | | |
|---|---|---|---|
| 2,744,314 | 5/1956 | Kinney, Jr. | 29/471.5 |
| 2,813,332 | 11/1957 | Keay, Jr. | 29/471.5 |
| 3,022,201 | 2/1962 | Quinn et al. | 29/198 |
| 3,417,461 | 12/1968 | Wells et al. | 29/198 X |
| 3,463,620 | 8/1969 | Winter | 29/198 X |

Primary Examiner—L. Dewayne Rutledge
Assistant Examiner—G. K. White
Attorney—Norman J. O'Malley, John F. Lawler and Theodore C. Jay, Jr.

[57] ABSTRACT

A malleable composite product comprising at least two malleable metals in proportions that form brittle alloys with the metals arranged in a pair of overlapping outer layers and at least one inner layer. The outer layers are hermetically sealed to each other around the inner layer(s) and the cross-sectional weight ratio of metals is constant across the entire product.

2 Claims, 4 Drawing Figures

COMPOSITE BRAZING ALLOY OF TITANIUM, COPPER AND NICKEL

BACKGROUND OF THE INVENTION

This is a division of application Ser. No. 716,455 filed Mar. 27, 1968, and now U.S. Pat. No. 3,561,099.

This invention relates to malleable composite assemblies. More particularly, this invention relates to a brazing alloy including outer layers of a first metal system and at least one inner layer of a second metal system, the inner layer(s) being susceptible to greater plastic deformation than the outer layers.

Among the alloy systems that are useful for low-temperature brazing or soldering are some that are non-malleable, i.e., brittle in their alloy form. Such alloys tend to crack and break, especially when attempts are made to reduce the cross section thereof when forming the thin layers that are suitable for precision applications. This physical limitation substantially reduces the usefulness of such alloys when the brazing or soldering application requires that the alloy be, for example, in thin sheets, ribbons or foils to conform to the surfaces being joined. Although this characteristic may be of no consequence to the function of the joint between the bonded parts after completion of the soldering or brazing operation, the brittleness limits the ease with which the alloy may be shaped into the desired product configuration.

To overcome these disadvantages, brazing metals that produce brittle alloys have been formed first as separate metal layers that are then combined into a physically bonded, but non-alloyed, malleable assembly. Thereafter various metal working techniques such as hot rolling have been employed to provide the composite assembly in the desired thin final gauges. The resulting intermediate composition is not limited by the brittle characteristics inherent in the ultimate alloy and can be converted, by forming, punching, bending and the like, into shapes desirable for soldering and brazing. Once the composite product is positioned for bonding, the application of brazing temperatures simultaneously produces the required alloy and accomplishes the intended brazing.

U.S. Pat. Nos. 3,169,048 and 3,181,935 disclose the preparation of brazing alloys in this manner from various metals that are fabricated as layers (sheets) and subsequently subjected to various metal working procedures to provide the desired thickness and/or shape of the composite product. However, the procedures disclosed in the aforementioned patents are complicated by the variations in the plastic deformation characteristics of the layers of metal. Thus, for example, when a brazing sandwich of tin and gold is being formed, hot rolling of the more malleable tin creates a substantial amount of tin stretch-off. In order to compensate for this and maintain the desired weight ratio of gold to tin, it is necessary to add layers of tin to the partially rolled structure to measure the tin thickness and maintain the desired weight ratio. This, of course, necessitates additional pressure rolling before the ultimate reduction in thickness is finally attained. In other instances, the inner layer(s) may be susceptible to rapid oxidation or corrosion so that a satisfactory diffusion bond is not produced between the inner and outer layers.

SUMMARY OF THE INVENTION

A composite product with a malleable inner metal layer and less malleable outer metal layers is provided in any final gauge desired with the correct weight ratio between the external metallic layers and the internal metallic layers.

Thus, it is a principal object of this invention to provide a brazing or soldering product, an adhered to physically bonded non-alloyed malleable assembly of brittle alloy-forming components in proportions adapted, upon firing in situ during brazing or soldering, to form an alloy suitable for accomplishing the desired brazing or soldering.

A further object of this invention is the provision of thickness-reduced non-alloyed malleable assembly of brittle alloy-forming metallic components in the proportions desired for the ultimate alloy.

It is another object of this invention the provision of a non-alloyed malleable assembly including titanium, copper and nickel having a thickness of less than 0.05 inch.

DESCRIPTION OF PREFERRED EMBODIMENT

Figure 1:
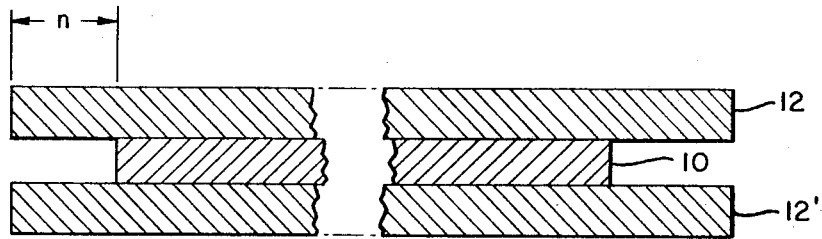
FIG. 1 is a diagram illustrating the initial configuration of a non-alloyed malleable assembly.

Referring now to the drawing wherein similar characters of reference represent corresponding features in each of the several views, there is shown in FIG. 1 a layer 10 formed from a ductile metal or alloy such as nickel or a 50—50 nickel-copper alloy. Layer 10 is provided on opposite faces with contiguous layers 12 and 12' of a less malleable metal such as titanium. Although the weight ratio of an inner layer alloy such as nickel and copper can be controlled initially during the formation of the alloy layer 10, the weight ratio of the outer layer to the inner layer will be dependent upon the actual thicknesses of layers 10, 12 and 12'.

Figure 2:
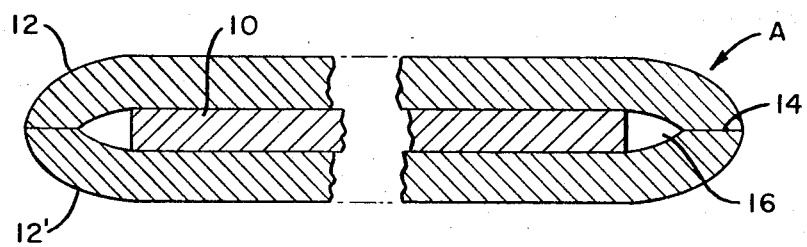
FIGS. 2 and 3 illustrate intermediate steps in the formation of the assembly.

Layers 12 and 12' are fabricated to be a size sufficient to overlap layer 10 by a distance $n$ around the entire circumference thereof. The width of $n$ should be sufficient so that layers 12 and 12' can be welded to each other around the periphery of layer 10, as illustrated by weld 14 in FIG. 2. Although it will be apparent to one skilled in this art that many methods can be employed to produce the welding, it has been found that a particularly good hermetic seal is obtained when an electron beam welding process is employed. In addition, by carrying out the welding operation in a vacuum further advantages, as more specifically set forth below, are obtained. To ensure that layers 12 and 12' are attached to each other and not to inner layer 10, sufficient overlap $n$ is employed to leave a vacuum gap 16 extending around the periphery of layer 10 and within the overlapping envelope formed by adhering layers 12 and 12' along weld 14. This gap will normally be occupied by inner layer 10 during the subsequent thickness reduction of assembly A.

Figure 3:
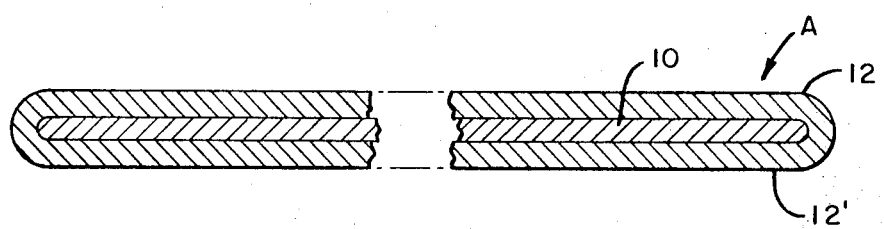
Figure 4:
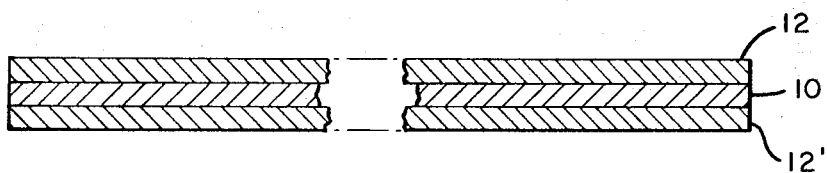
FIG. 4 is a diagram illustrating the final product.

Referring now to FIG. 3 illustrating assembly A reduced as desired by conventional metal working such as hot rolling, it will be seen that in spite of the softness of layer 10, its thickness has remained proportional to the total thickness of layers 12 and 12'. FIG. 4 illustrates the resulting sandwich configuration obtained by trimming assembly A to remove the peripheral weld formed by the overlap of layers 12 and 12'. Thus, irrespective of the amount of actual size reduction desired, the cross-sectional weight ratio of assembly A will remain constant because the softer layer is enclosed within the outer envelope and will be limited in its expansion or deformation by the confines of the envelope. Thereafter, heat treatment during brazing or soldering will create an alloy having the desired composition.

Because of the temperatures involved in the various annealing and rolling operations required to accomplish the size reduction desired, layers 12 and 12' will be to some degree diffusion bonded to layer 10. As a result, the composite assembly will remain in the desired physical configuration prior to and during placement for the brazing or soldering operation even after removal of the welded peripheral overlap.

It will be apparent to one skilled in this art that the foregoing process is useful in the preparation of brazing alloys from any of the metal compositions that normally form brittle alloys. Typical examples include gold-indium, gold-tin, gold-aluminum, titanium-copper, titanium-nickel and titanium-copper-nickel. Preparation of a titanium-copper-nickel system containing by weight from 40–90 percent titanium, 5–30 percent copper and 5–30 percent nickel has been found to be especially advantageous with the instant process.

When producing such a titanium-copper-nickel system, the following specific advantages are obtained: First, the weld hermetically seals the copper-nickel alloy within the titanium outer wrapping, thus preventing oxidation of the copper-nickel alloy during hot rolling. Were such oxides produced, they would interfere with good bonding between the titanium and the copper-nickel alloy. In addition, the presence of such oxides is detrimental to the ultimate strength of the alloy in the brazed joint. Second, hot rolling produces an oxidation layer on the outside surface of the titanium that must be removed by treatment in a strongly corrosive solution such as a hydrogen flouride-nitric acid bath. This type of bath would rapidly attack the copper-nickel alloy. This is prevented by the hermetically sealed titanium envelope. Third, the vacuum created within the titanium envelope promotes intimate contact between the titanium layer and copper-nickel alloy layer and enhances the rate of solid state diffusion across the interface during the rolling and annealing operations.

By way of further illustration of the process of forming the alloy embodying this invention, the following example is provided. It should be understood that the details thereof are not to be regarded as limitations as they will be varied as may be understood by one skilled in this art.

An alloy of copper and nickel containing 50 percent by weight of each was vacuum-cast and rolled to a thickness of about 0.020 inch. After strand annealing in hydrogen gas at 1,600° F., the sheet was rolled to about 0.015 inch. The sheet was flat and found to be gas-free. The sheet was cut and slit into 3 ½×17 ¼ inch segments. The segments were de-greased, pickled with a solution of hydrogen chloride and water-washed.

An annealed titanium sheet having a thickness of about 0.032 inch was cut into 4×18 inch sections. The sections were surface-cleaned with a bath of hydrogen fluoride-nitric acid and water-rinsed. A copper-nickel segment was sandwiched between two sections of titanium, leaving about a 3/16-inch clearance around the entire periphery of the copper-nickel alloy segment. This amount of clearance was found sufficient to provide a welding surface and also to prevent reaction of the copper-nickel alloy with titanium during the welding operation. The titanium layers were electron beam welded entirely around the periphery thereof in a vacuum of 2×10$^{-4}$ mm. mercury. Although the electron beam easily welded across the 0.015-inch gap between the titanium sections, wider gaps might require a shim of corresponding metal to produce the desired continuous hermetic seal.

The composite assembly was then heated in air at about 1,400° F. for 10 minutes and rolled. The first pass reduced the thickness of the assembly from about 0.080 inch to about 0.055 inch. The assembly was alternately reheated at about 1,400° F. and re-rolled until the thickness of the assembly was reduced to about 0.030 inch.

The assembly was then cooled and treated in a hydrogen fluoride-nitric acid bath and water-washed. The assembly was then annealed at 1,300° F. for 30 minutes under vacuum conditions (2×10$^{-4}$ mm. mercury). Upon completion of the annealing, the assembly was again treated with the aforementioned bath to remove any corrosion from the titanium surfaces. The assembly was cold rolled to a thickness of about 0.014 inch, again vacuum annealed and finally rolled to a thickness of 0.005 inch. It will be apparent to one skilled in this art that a wide range of size reduction will not be uncommon.

Samples were removed from each end of the composite assembly and found to have the following chemical analysis in percent by weight:

| Calculated Actual | | | |
|---|---|---|---|
| | 15.0 copper | 15.0 nickel | 70 titanium |
| End 1 | 15.15 copper | 15.40 nickel | 69.45 titanium |
| End 2 | 15.35 copper | 15.85 nickel | 68.80 titanium |

The resulting composite assembly was then employed in a brazing operation wherein it was found to liquate at 1,625° F., flow at 1,670° F., and simultaneously alloy and braze at 1,760° F.

A similar composite assembly was fabricated by utilizing as a starting structure separate layers of copper and nickel sandwiched between outer layers of titanium. Subsequent to treatment in the aforementioned procedure, the composite product was found to have alloy characteristics similar to that of the composite product formed with an alloy as the starting inner layers.

What is claimed is:

1. A malleable composite product useful for brazing, soldering and the like, comprising titanium, copper and nickel in proportions that form brittle alloys, said product including a pair of outer layers formed by said titanium, and inner layer formed from said copper and nickel, each of said outer layers being at least partially diffusion-bonded to said inner layer, said pair of outer layers being sealed to each other around their periphery to provide a gastight enclosure for said inner layer.

2. A malleable product in accordance with claim 1 wherein the malleable composite product is, in percent by weight, 40–90percent titanium, 5–30percent nickel and 5–30percent copper.

* * * * *